(12) United States Patent
Girvin

(10) Patent No.: US 8,756,856 B1
(45) Date of Patent: Jun. 24, 2014

(54) FLOATING APPARATUS USEFUL FOR SHELLFISH HUNTING AND THE LIKE

(76) Inventor: Michael Girvin, Siasconset, MA (US)

( * ) Notice: Subject to any disclaimer, the term of this patent is extended or adjusted under 35 U.S.C. 154(b) by 376 days.

(21) Appl. No.: 13/152,922

(22) Filed: Jun. 3, 2011

(51) Int. Cl.
 *A01K 97/20* (2006.01)
(52) U.S. Cl.
 USPC ................................. 43/55; 43/54.1; 220/560
(58) Field of Classification Search
 USPC ................................. 43/55, 56, 54.1; 220/560
 See application file for complete search history.

(56) References Cited

U.S. PATENT DOCUMENTS

| | | | | | |
|---|---|---|---|---|---|
| 307,375 | A | * | 10/1884 | Busche | 43/56 |
| 2,241,314 | A | * | 5/1941 | Mohler | 43/55 |
| 2,927,995 | A | * | 3/1960 | Francis | 43/23 |
| 3,025,629 | A | * | 3/1962 | Sears | 43/55 |
| 3,162,813 | A | * | 12/1964 | Piccinini | 455/351 |
| 3,182,340 | A | * | 5/1965 | Gentile | 441/32 |
| 3,478,463 | A | * | 11/1969 | Ruter | 43/55 |
| 4,101,996 | A | * | 7/1978 | Mikulecky | 441/131 |
| 4,152,704 | A | * | 5/1979 | Burg | 343/709 |
| 4,297,804 | A | * | 11/1981 | Weld | 43/55 |
| 4,353,182 | A | * | 10/1982 | Junkas et al. | 43/54.1 |
| 4,503,563 | A | * | 3/1985 | Johnson | 455/344 |
| 4,570,374 | A | * | 2/1986 | Baxley | 43/55 |
| 4,638,593 | A | * | 1/1987 | Garcia | 43/54.1 |
| 4,641,014 | A | * | 2/1987 | Bland | 392/385 |
| 4,794,723 | A | * | 1/1989 | Arnold et al. | 43/55 |
| 4,841,661 | A | * | 6/1989 | Moore | 43/54.1 |
| 4,856,087 | A | * | 8/1989 | Nesbit | 455/344 |
| 4,858,372 | A | * | 8/1989 | Ray | 43/55 |
| 4,870,778 | A | * | 10/1989 | Sheppard | 43/55 |
| 4,878,311 | A | * | 11/1989 | Cano | 43/55 |
| 4,890,413 | A | * | 1/1990 | Nelson et al. | 43/55 |
| 4,903,429 | A | * | 2/1990 | Tetenes | 43/55 |
| 4,915,670 | A | * | 4/1990 | Nesbit | 455/344 |
| 4,927,041 | A | * | 5/1990 | Hepburn | 220/560 |
| 4,971,320 | A | * | 11/1990 | Nesbit et al. | 473/553 |
| 4,996,790 | A | * | 3/1991 | Ruggles | 43/55 |
| 5,117,577 | A | * | 6/1992 | Burghoff | 43/44.99 |
| 5,163,694 | A | * | 11/1992 | Reichek | 280/47.26 |
| 5,305,544 | A | * | 4/1994 | Testa, Jr. | 43/54.1 |
| 5,369,796 | A | * | 11/1994 | Kung | 455/344 |
| 5,402,596 | A | * | 4/1995 | Gillming, Jr. | 43/54.1 |
| 5,551,186 | A | * | 9/1996 | Harada | 43/55 |
| D375,781 | S | * | 11/1996 | Caldwell | D22/134 |
| 5,634,291 | A | * | 6/1997 | Pham | 43/56 |
| 5,755,057 | A | * | 5/1998 | Dancer | 43/54.1 |
| 5,802,760 | A | * | 9/1998 | Campbell | 43/57 |
| 6,014,833 | A | * | 1/2000 | Benavidez | 43/54.1 |
| 6,269,587 | B1 | * | 8/2001 | Wallace | 43/54.1 |
| 6,273,773 | B1 | * | 8/2001 | Bourke | 441/6 |
| 6,345,744 | B1 | * | 2/2002 | Eldridge | 224/153 |
| D454,863 | S | * | 3/2002 | Hudgeons | D14/232 |
| 6,607,090 | B1 | * | 8/2003 | Doerr | 220/560 |
| 6,814,709 | B2 | * | 11/2004 | Schwartz et al. | 601/57 |

(Continued)

*Primary Examiner* — Darren W Ark

(74) *Attorney, Agent, or Firm* — Jonathan A. Small

(57) ABSTRACT

A floating apparatus for receiving, containing, and transporting live catch in water is provided with a floating structure and a container structure disposed in the floating structure. The container structure is water permeable, such as by way of holes or mesh, to allow catch disposed therein to remain in water and alive. One or more conveniences are provided in the floating member, such as a water-resistant storage compartment, a cup holder recess, an audio output speakers, a radio tuner, a video display device, a water resistant battery compartment, a connector for connecting an electronic device to a speaker, a shellfish size gauge, and/or a tether clip or hook.

6 Claims, 3 Drawing Sheets

(56) References Cited

U.S. PATENT DOCUMENTS

| | | | |
|---|---|---|---|
| 7,143,540 B2 * | 12/2006 | Lessman et al. | 43/11 |
| 7,222,743 B1 * | 5/2007 | Wilhelm | 220/560 |
| 7,389,608 B1 * | 6/2008 | MacKay | 43/57 |
| 7,727,038 B2 * | 6/2010 | Le Gette et al. | 441/130 |
| 7,988,512 B2 * | 8/2011 | Lin et al. | 441/129 |
| 8,066,540 B2 * | 11/2011 | Le Gette et al. | 441/130 |
| 8,366,502 B2 * | 2/2013 | Lin et al. | 441/129 |
| 8,657,640 B2 * | 2/2014 | Le Gette et al. | 441/131 |
| 2005/0055869 A1 * | 3/2005 | Corso et al. | 43/54.1 |
| 2005/0279013 A1 * | 12/2005 | Iwaniec | 43/55 |
| 2006/0042152 A1 * | 3/2006 | Pearson | 43/54.1 |
| 2006/0080885 A1 * | 4/2006 | Wisocki | 43/18.1 R |
| 2011/0197494 A1 * | 8/2011 | Schumacher et al. | 43/54.1 |
| 2012/0040574 A1 * | 2/2012 | Grimes et al. | 441/74 |

\* cited by examiner

FLOATING APPARATUS USEFUL FOR SHELLFISH HUNTING AND THE LIKE

BACKGROUND

The present disclosure is related generally to floatable equipment carrying apparatus, and more specifically to a floating caddy for both keeping desired and essential equipment handy and dry and for temporarily storing the fruits of shellfish hunting submerged in water.

There are times in life when the conditions one finds one's self in conspire to preclude our having at hand things needed or wanted in such conditions. This is often attributable to lack of foresight, misfortune, or impracticality. In few circumstances is this felt more poignantly than when hunting for shellfish. It seems all too common an occurrence that one finds one's self waist deep in sea water, raking sand for clams, scallops, and the like, when a pang of thirst strikes, perhaps due to exposure to the sun, hard work, and so forth. However, with both hands occupied by a rake, and a net for catch clipped to one's side, there is really no convenient way to carry one, let alone multiple bottles of water or other preferred refreshment.

Similarly, many of us have found ourselves in the middle of a productive scallop bed only to suddenly remember an important phone call that needs to be made. Yet, there in addition to having our hands full, there is no simple and water-resistant mechanism for carrying a cellular phone in anticipation of such a need.

Even more practically, there is often a need or desire to sample one's catch upon bringing up fresh shellfish. Splitting open a fresh clam or scallop requires use of tools, condiments, and often a working surface. However, such items are relatively bulky, and not suited for simply being carried in a wader or pants pocket.

And, how does one provide music or play-by-play audio or video coverage of important world events, sporting contests, and the like, provide convenient access to a dry sandwich and chips, or even provide access to a dry tissue, when standing on a submerged sandbar far from shore?

There is also the constant battle with carrying one's catch while working. One common solution is to stay close to a boat, and deliver the fruitful contents of each rake stroke to that vessel. However, this becomes problematic when multiple fishermen have taken the same boat to the beds—they must stay relatively close together, limiting the effectiveness of the fishing. This also requires that a seawater-baring container be provided onboard so that the crustacea may be kept alive and fresh for delivery to land. Desirably, but challengingly, the conditions (temperature, salinity, etc.) in such a container should match those from which the shellfish are harvested. Another common solution involves carrying a net or bag clipped to one's belt and into which the catch may be deposited and retained underwater. However, this is sub-optimal in that such a receptacle quickly becomes heavy, bulky, and otherwise burdensome and potentially dangerous, as well as hindering the flexibility, grace, and dexterity required for ideal shellfish location and retrieval.

While efforts have been made to address many of the individual shortcomings identified above, no known mechanism exists for simply, effectively, and simultaneously addressing all of these demands.

SUMMARY

Accordingly, an apparatus is disclosed for conveniently and effectively transporting shellfish catch and the like with accesses to additional conveniences. An apparatus is disclosed that provides a water-permeable container for shellfish and the like retrieved during a fishing expedition, which may be attached to a user by a tether or the like such that it may be pulled along as the user moves from place to place on such an expedition. Water-resistant storage region may be provided for retaining items such as a cell phone, tobacco products, and the like which are susceptible to water damage. Recesses and holders may also be provided for ready access to essential and desired supplies. Audio speakers, and possibly a video display, may also be provided to support the option of playing audio and/or video content. Connection facilities may be provided to connect an audio/video source by way of Bluetooth or similar wireless channel, for example to a device retained in the water-resistant storage region. A water-resistance compartment may be provided for batteries and/or a solar panel may be attached to the apparatus.

According to one aspect of the present disclosure, an apparatus is provided for the containment and transportation of catch in water, comprising a flotation structure comprised of a material and form so as to allow said floatation structure to float when the apparatus is in use in water, a container structure disposed within and connected to said flotation structure, the container structure disposed so as to be partially submersed when the apparatus is in use in water, the container structure further having formed therein a plurality of openings sized such that water may enter the portion of the container structure which is partially submersed when the apparatus is in use in water but limited in size so that catch carried within the container structure cannot escape therefrom, one or more conveniences formed in the flotation structure to allow a user of said apparatus to access the one or more conveniences in an effective and convenient manner.

According to another aspect of the disclosure, the one or more conveniences are provided in the floating member, such as a water-resistant storage compartment, a cup holder recess, an audio output speakers, a radio tuner, a video display device, a water resistant battery compartment, a connector for connecting an electronic device to a speaker, a shellfish size gauge, and/or a tether clip or hook.

The above is a summary of a number of the unique aspects, features, and advantages of the present disclosure. However, this summary is not exhaustive. Thus, these and other aspects, features, and advantages of the present disclosure will become more apparent from the following detailed description and the appended drawings, when considered in light of the claims provided herein.

BRIEF DESCRIPTION OF THE DRAWINGS

In the drawings appended hereto like reference numerals denote like elements between the various drawings. While illustrative, the drawings are not drawn to scale. In the drawings.

DETAILED DESCRIPTION

We initially point out that description of well-known starting materials, processing techniques, components, equipment and other well-known details are merely summarized or are omitted so as not to unnecessarily obscure the details of the present invention. Thus, where details are otherwise well known, we leave it to the application of the present invention to suggest or dictate choices relating to those details.

Figure 1:
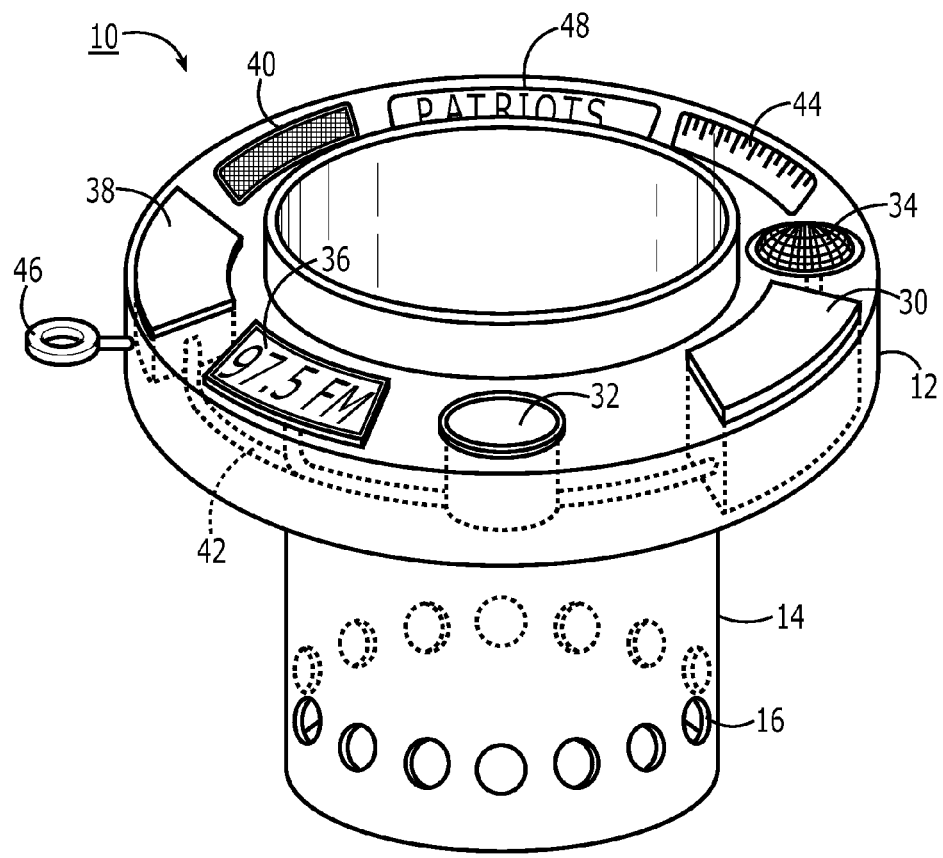
FIG. 1 is a perspective view of an apparatus for conveniently and effectively transporting shellfish catch and the like with accesses to additional conveniences, according to a first embodiment of the present disclosure.

With reference first to FIG. 1, there is shown therein an apparatus 10 for conveniently and effectively transporting shellfish catch and the like with accesses to additional conveniences. Apparatus 10 consists of a ring-shaped floatation structure 12 into which a compartment structure 14 is either formed or disposed. Ring-shaped floatation structure 12 is formed of a material with a density that permits it to float on, and not absorb water. In use, apparatus 10 will generally sit on the surface of the body of water in which the user is fishing, while a portion of compartment structure 14 extends below the lower surface of ring-shaped floatation structure 12. Shellfish caught by the user may be deposited into compartment structure 14 for storage and transportation. Compartment structure 14 may be rigid, such as similar to a plastic bucket or the like, or may alternatively be flexible, such as a mesh net or the like.

Compartment structure 14 extends such that, in use, a portion thereof extends into the body of water in which the user is fishing. In the embodiment in which compartment structure 14 is a rigid structure, holes 16 or a mesh region (not shown) is provided in a portion of compartment structure 14 to allow water from the body of water in which the user is fishing to partly fill compartment structure 14 and cover catch deposited therein. This permits the catch to remain in the environment in which it thrives, and thereby stay alive, for as long as possible and remain fresh its next destination (consumption, research, display, etc.) In the embodiment in which compartment structure 14 is a flexible mesh net, the openings in the mesh allow the water to cover the catch for the same result.

Figure 2:
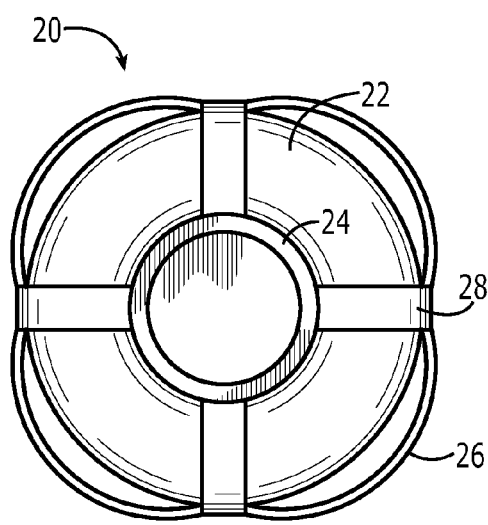
FIG. 2 is a plan view of a ring-shaped structure of an apparatus for conveniently and effectively transporting shellfish catch and the like with accesses to additional conveniences, according to a second embodiment of the present disclosure.

In an alternate embodiment, apparatus 20 shown in FIG. 2, the ring-shaped floatation structure may be a traditional floating "ring preserver" 22 (also known as a ring-shaped life preserver, personal flotation device, Lifebuoy, or a ring-shaped flotation device) in which a compartment structure 24 is formed or disposed. In this embodiment, rope handles 26 may be provided to assist with transporting apparatus 20, with or without catch therein. Lashing straps 28 secure the rope handles to the ring preserver. Furthermore, according to this embodiment, apparatus 20 may double to perform the life saving role of a traditional ring preserver in case of emergency. Compartment structure 14 may optionally be removably disposed within the flotation structure formed by ring preserver 22, to further facilitate its use in emergency situations. (Indeed, in all embodiments herein the compartment structure may optionally be removably disposed within the flotation structure to serve a wide variety needs.)

Returning to FIG. 1, ring-shaped floatation structure 12 may be provided with a number of conveniences. A first of these conveniences is a water-resistant storage compartment 30. This compartment may have one of a variety of shapes, and include one or more of a wide variety of apparatus for maintaining the interior thereof free of water from the body of water in which the user is fishing. Another of these conveniences is one or more cup holder recesses 32 (shaped appropriately for cans, bottles, travel coffee cups etc.)

There are many use scenarios for a transport device of the type described herein in which audio and possible video output would be preferred or even necessary. Examples range from simply listening to music (shellfish are rarely startled by surface music in the way fish often are) to being provided weather report information. In one application a transport device of the type disclosed herein may be branded with a logo 48 (e.g., a baseball or football team logo or the like), and promoted as being able to provide a user with audio or video coverage of games for the branded team. Accordingly, one or more audio output speakers 34 may be provided, for example in an upper surface of apparatus 10. Similarly, a radio tuner and/or video display device 36 may also be provided in the upper surface of apparatus 10. For obvious reasons, audio output speakers 34 and radio tuner/video display device 36 should be of the water-resistant type.

The audio or video source driving speaker 34, as well as the radio tuner/video display device 36 each require an energy source. Accordingly, a water resistant battery compartment 38 and/or one or more solar cells 40 may be provide in the upper surface of apparatus 10, interconnected by electrical cabling 42 to radio tuner/video display device 36. In addition, the user may wish to plug in a portable audio or video source, such as an Apple iPod, MP3 player, portable digital video disk (DVD) player, cellular telephone, etc. Such a device may, for example, be stowed in water-resistant storage compartment 30. Accordingly, power interconnection cables, and audio input cables may be run into water-resistant storage compartment 30 providing great flexibility to the user in terms of audio and video selection.

Finally, in terms of the top surface of apparatus 10, a gauge or measuring device may be provided allowing the fisherman to measure and ensure that the catch is of legal size. For example, in Massachusetts the legal size for a quahog clam is one-and-one-half inches across, surf clams must be at least 5 inches at the widest, blue mussels must be one-and-one-half inches in length, and so forth. A gauge 44 may be provided which provides the then-current legal minimum sizes, allowing the fisherman to simply hold the catch against the scale and compare its size to the matching picture or dimension for the specific species. Field-applicable labels may permit the fisherman to update or add to the scale for new minimum sizes, provide minimum sizes for different jurisdictions, etc.

Figure 3:
FIG. 3 is an illustration of an apparatus for conveniently and effectively transporting shellfish catch and the like with accesses to additional conveniences, in use according to an embodiment of the present disclosure.

In certain embodiments it is desirable to permit apparatus 10 to be tethered to a boat, to the fisherman, to a dock or to some other person or structure. Apparatus 10 may therefore be fitted with a clip or hook 46 permitting a tether secured for example to the user's belt to connect apparatus 10 to the user. As the user moves from bed to bed, apparatus 10 is simply towed behind the user, and is therefore always close by and convenient for receiving catch. This use scenario is illustrated in FIG. 3, in which user 50, standing in water 52 in proximity of a shellfish bed has retrieved shellfish 54 via rake 56, and is depositing it into apparatus 10, specifically into compartment structure 14. Apparatus 10 is tethered to user 50's belt so that as he moves from bed to bed apparatus 10 follows close behind.

Figure 4:
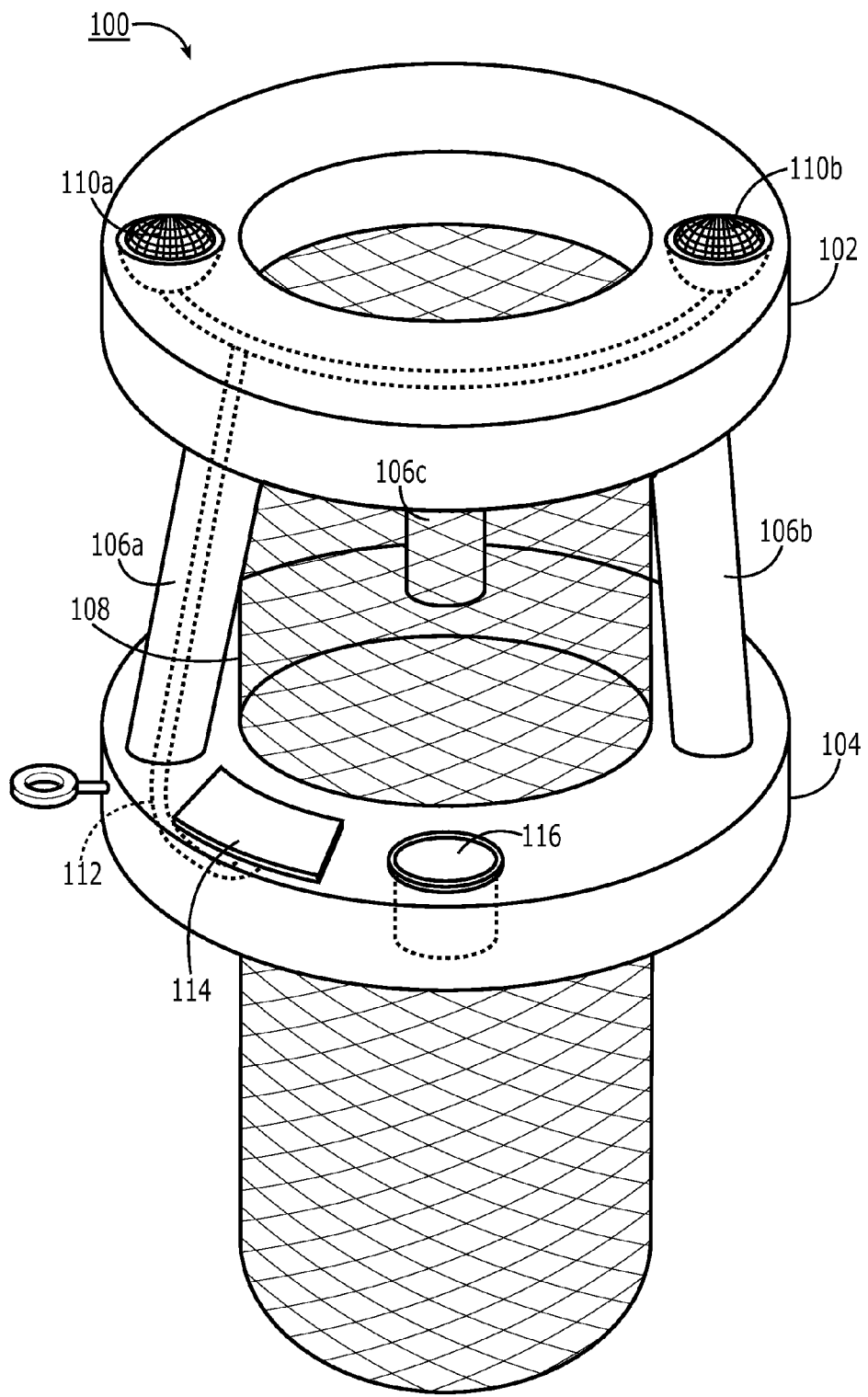
FIG. 4 is a perspective view of an apparatus for conveniently and effectively transporting shellfish catch and the like with accesses to additional conveniences, according to a third embodiment of the present disclosure.

While the foregoing has described one embodiment in terms of a ring-shaped floatation structure which sits directly on the water, in another embodiment shown in FIG. 4, an apparatus 100 for conveniently and effectively transporting shellfish catch and the like with accesses to additional conveniences comprises dual, generally parallel ring-shaped floatation structures 102, 104 connected by stanchions 106, with mesh compartment structure 108 disposed therebetween. In this embodiment, at least ring-shaped floatation structure 104 is formed of a material with a density that permits it to float on, and not absorb water. In use, ring-shaped floatation structures 104 will generally sit on the surface of the body of water in which the user is fishing, with ring-shaped flotation structure 102 elevated thereabove. Compartment structure 108 may be connected to ring-shaped floatation structures 102, ring-shaped floatation structures 104, or both ring-shaped floatation structures 102 and 104. A portion of compartment structure 108 extends below the lower surface of ring-shaped floatation structure 104 into the water on which apparatus 100 sits. Shellfish caught by the user may be deposited into compartment structure 108 through an opening in ring-shaped region 102 (or alternatively an opening in ring-shaped region 104) for storage and transportation.

As with the disclosure of apparatus 10, ring-shaped floatation structure 102 and/or ring-shaped flotation structure 104 of apparatus 100 may be provided with a number of conveniences. Without limitation, these conveniences may include those described above, including: a water-resistant storage compartment; one or more cup holder recesses; one or more audio output speakers; radio tuner/video display device; a water resistant battery compartment; one or more solar cells; electrical cabling connecting battery, display, speakers, and optional personal electronic devices; a shellfish size gauge; and clip or hook for attaching a tether. While not specifically illustrated in FIG. 4, each of these conveniences are shown and described with regard to FIG. 1. For example, and without limitation, audio speakers 110*a*, 110*b* are shown disposed in ring-shaped structure 102, connected by interconnection cable 112 which runs through ring-shaped structure 102, stanchion 106*a*, and ring-shaped structure 104, to water-resistant storage compartment 114 (e.g., for connection to a portable music player) disposed in ring-shaped structure 104. Cup holder 116 is also shown for illustrative purposes.

Furthermore, as with floatation structure associated with apparatus 10, one or both of first and second floatation structures 102, 104 may take the form of a ring preserver, and be removable from apparatus 100 for use as a personal floatation device in emergency conditions.

While the above has described uses of apparatus 10 for conveniently and effectively transporting shellfish and the like, it will be appreciated that without significant modification, apparatus 10 may be used to transport other catch, such as fish, water-borne vegetation, creatures or vegetation living close to water so that catching requires that a user be in the water for the catch, etc.

Furthermore, while the embodiments described above have been in terms of ring-shaped floatation structures, these regions may in fact not be round in plan-view, but may be oval, rectangular, or virtually any other shape as warranted by the application and design of the apparatus for conveniently and effectively transporting shellfish and the like. And furthermore, while the top opening of the ring-shaped floatation structure of the embodiments described above are shown without lids or other closure mechanism, in certain embodiments it will be desirable to provide such a lid or closure mechanism, such as where it is desirable to prevent catch from escaping from the apparatus (not usually an issue for shellfish), prevent birds or other scavengers from stealing the catch from the apparatus, keep sun off of the contents of the apparatus, and so on.

While a plurality of exemplary embodiments have been presented in the foregoing detailed description, it should be understood that a vast number of variations exist, and these exemplary embodiments are merely representative examples, and are not intended to limit the scope, applicability or configuration of the disclosure in any way. Various of the above-disclosed and other features and functions, or alternative thereof, may be desirably combined into many other different systems or applications. Various presently unforeseen or unanticipated alternatives, modifications variations, or improvements therein or thereon may be subsequently made by those skilled in the art which are also intended to be encompassed by the claims, below.

Therefore, the foregoing description provides those of ordinary skill in the art with a convenient guide for implementation of the disclosure, and contemplates that various changes in the functions and arrangements of the described embodiments may be made without departing from the spirit and scope of the disclosure defined by the claims thereto.

What is claimed is:

1. An apparatus for the containment and transportation of catch in water, comprising:
   a floatation structure comprised of a material and form so as to allow said floatation structure to float when the apparatus is in use in water, said floatation structure being a ring-shaped structure;
   a container structure disposed within and connected to said floatation structure, said container structure disposed so as to be partially submersed when the apparatus is in use in water, said container structure further having formed therein a plurality of openings sized such that water may enter a portion of said container structure which is partially submersed when the apparatus is in use in water but limited in sized so that catch carried within said container structure cannot escape therefrom;
   at least one convenience formed in said floatation structure to allow a user of said apparatus to access said at least one convenience in an effective and convenient manner, said convenience is selected from the group consisting of: a water-resistant storage compartment, a cup holder recess, at least one water-resistant audio output speaker, a water-resistant radio tuner, a water-resistant video display device, a water-resistant battery compartment, a connector for connecting an electronic device to a speaker, a shellfish size gauge, and a tether clip or hook; and
   wherein said at least one convenience formed in said floatation structure comprises said water-resistant storage compartment, said cup holder recess, said at least one water-resistant audio output speaker, said shellfish size gauge, and said tether clip or hook.

2. The apparatus of claim 1, wherein said floatation structure has disposed therein cabling in a water-resistant manner to permit connection of an audio source to said at least one water-resistant audio output speaker.

3. The apparatus of claim 2, wherein said at least one convenience formed in said floatation structure further comprises said water-resistant radio tuner and said water resistant battery compartment, said water-resistant radio tuner being electrically interconnected to said at least one water-resistant audio speaker by said cabling, and said water-resistant battery compartment for receiving a battery such that said battery is electrically interconnected to said water-resistant radio tuner.

4. The apparatus of claim 2, wherein said at least one convenience formed in said floatation structure further comprises said water-resistant video display device and said water-resistant battery compartment, said floatation structure has disposed therein a video source electrically interconnected to said at least one water-resistant audio speaker by said cabling, and said water-resistant battery compartment for receiving a battery such that said battery is electrically interconnected to said video source and water-resistant video display.

5. The apparatus of claim 1, wherein said container structure is selected from the group consisting of: plastic bucket, and flexible mesh bag.

6. The apparatus of claim 1, further comprising a logo-receiving region for replaceably receiving a logo-bearing member.

\* \* \* \* \*